No. 692,486. Patented Feb. 4, 1902.
E. SEYBOLD & C. E. MOUNTFORD.
HANDLE.
(Application filed Oct. 22, 1901.)
(No Model.)
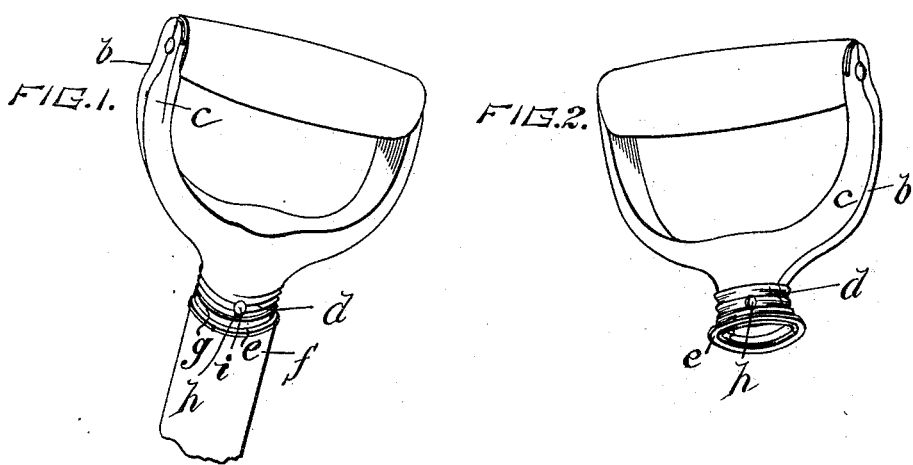
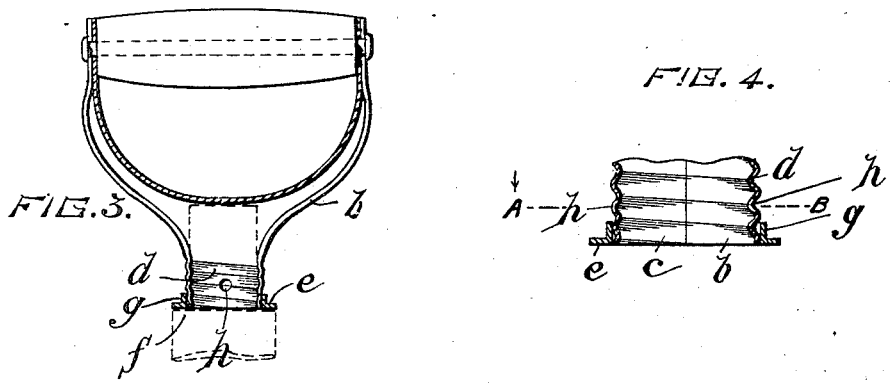
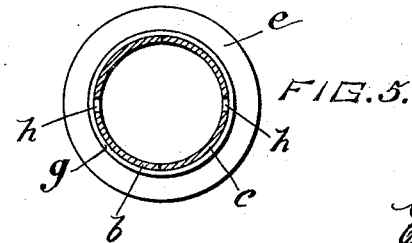
Witnesses
Edward Seybold
Clarence E. Mountford
Inventors
By their Attorney

UNITED STATES PATENT OFFICE.

EDWARD SEYBOLD AND CLARENCE ERNEST MOUNTFORD, OF OTTAWA, CANADA, ASSIGNORS TO THE ECLIPSE OFFICE FURNITURE COMPANY OF OTTAWA, LIMITED, OF OTTAWA, CANADA, A CORPORATION.

HANDLE.

SPECIFICATION forming part of Letters Patent No. 692,486, dated February 4, 1902.

Application filed October 22, 1901. Serial No. 79,576. (No model.)

*To all whom it may concern:*

Be it known that we, EDWARD SEYBOLD and CLARENCE ERNEST MOUNTFORD, of the city of Ottawa, Province of Ontario, Dominion of Canada, have invented certain new and useful Improvements in Handles; and we do hereby declare that the following is a full, clear, and exact description of the same.

Our invention relates particularly to the type of handle disclosed and claimed in our pending application filed on June 22, 1901, under Serial No. 65,638, although its individual features can be applied to advantage to handles generally for shovels, pitchforks, and other implements or devices requiring a cross-handle.

The object of the present invention is to render the shank of the handle more rigid and the connection therebetween and the shaft of the implement or device to which it may be applied more durable.

The invention may be said, briefly, to consist in forming the shank of the handle with a screw-thread adapted to take upon the shaft of the implement and furnishing the shank thus formed with a strengthening-ferrule.

For full comprehension, however, of the invention reference must be had to the accompanying drawings, forming a part of this specification, and wherein—

Figure 1 is a perspective view illustrating our improved handle fitted upon the shaft of a shovel or the like. Fig. 2 is a similar view of our improved handle removed. Fig. 3 is a transverse vertical sectional view thereof; Fig. 4, an enlarged detail sectional view of the lower end of the shank of our improved handle; and Fig. 5 is a detail sectional view illustrating the ferrule strengthening the lower end of the shank of our improved handle, the section being taken on line A B, Fig. 4.

The frame of our improved handle is preferably constructed similar to that illustrated in our said pending application and is made from a sheet-metal blank bent into the form shown, with the shank consisting of two abutting semicircular halves $b$ and $c$, which when in abutting relation constitute a tubular shank. A continuous screw-thread $d$ is formed by dieing or otherwise in this tubular shank, and the halves of the latter are maintained rigidly in abutting relation by means of a ferrule swaged or otherwise formed to have a flat portion $e$ to fit upon the end $f$ of the shaft of the implement and a flange $g$ at right angles thereto to clasp the lower end of the shank of the handle and render same rigid, while the shank itself is preferably perforated, as at $h$, to allow the introduction therethrough and into the shaft of the implement of a retaining-pin $i$.

To secure this handle in place, we prefer to first diminish the end of the implement-shaft to a diameter equal to the greatest interior diameter of the screw-threaded shank of the handle, and the handle is then turned with the end of its shank forced upon the extreme end of the shaft, which causes said screw-thread of the shank to form a corresponding thread upon the diminished portion of the shaft, which effectively retains the handle against longitudinal displacement, and in order to more effectively retain it against circumferential displacement we drive the pin $i$ into place.

It is obvious that any construction of handle having a tubular shank or attachment to the shank can have its shank screw-threaded, as shown, or said attachment so formed and attached to the shaft of an implement in a similar manner as described without the necessity of a separate ferrule and within the spirit of our invention.

What we claim is as follows:

1. A handle the shank whereof consists of abutting semicircular halves said halves being conjointly formed with a continuous screw-thread to be threaded upon an implement and means for retaining said halves against displacement relatively to one another, substantially as described.

2. A handle the shank whereof consists of abutting semicircular halves, said halves being conjointly formed with a continuous screw-thread to thread upon the shank of an implement, and a ferrule fitting upon the end of said shank, substantially as described and for the purpose set forth.

3. A handle the shank whereof consists of abutting semicircular halves, said halves being conjointly formed with a continuous screw-thread to thread upon the shank of an implement, and a ferrule consisting of an annulus of rectangular cross-section sprung upon the end of said shank, substantially as described and for the purpose set forth.

4. A D-handle frame consisting of a single piece of sheet metal bent in the form of a fork the shank whereof consists of two resilient semicircular portions detached from and abutting against one another, said semicircular portions being conjointly formed with a continuous screw-thread to be threaded upon an implement and means for retaining said halves against displacement relatively to one another, substantially as described.

In testimony whereof we have affixed our signatures in presence of two witnesses.

EDWARD SEYBOLD.
CLARENCE ERNEST MOUNTFORD.

Witnesses:
JAMES GIBSON,
W. H. CONNOR.